3,479,452
MACHINE FOR PRODUCING ENGRAVING PLATES FOR STEREOSCOPIC REPRODUCTIONS
John R. Hancock, Garden City, and Harold Sigler, Brooklyn, N.Y., assignors to Fairchild Camera and Instrument Corporation, a corporation of Delaware
Filed Dec. 19, 1966, Ser. No. 602,640
Int. Cl. H04m 5/76; G03c 9/00
U.S. Cl. 178—6.6                          10 Claims

ABSTRACT OF THE DISCLOSURE

An apparatus for producing engraving plates with interlaced images of two different copy subjects. Two detachable drums with different copy subjects mounted on each drum and an engraving drum on which the interlaced engraving is made are provided. A cam rotated in synchronism with the common mounting shaft of the detachable and engraving drums operates a switch which intermittently disables the output of the scanning mechanism during every other line of the copy subject scanned. The mounting positions of the first and second copy drums, relative to the engraving drum are dispaced one line scan from each other. By intermittent scanning of the two drums an interlaced engraving of the two copies is reproduced.

---

Figure 1:
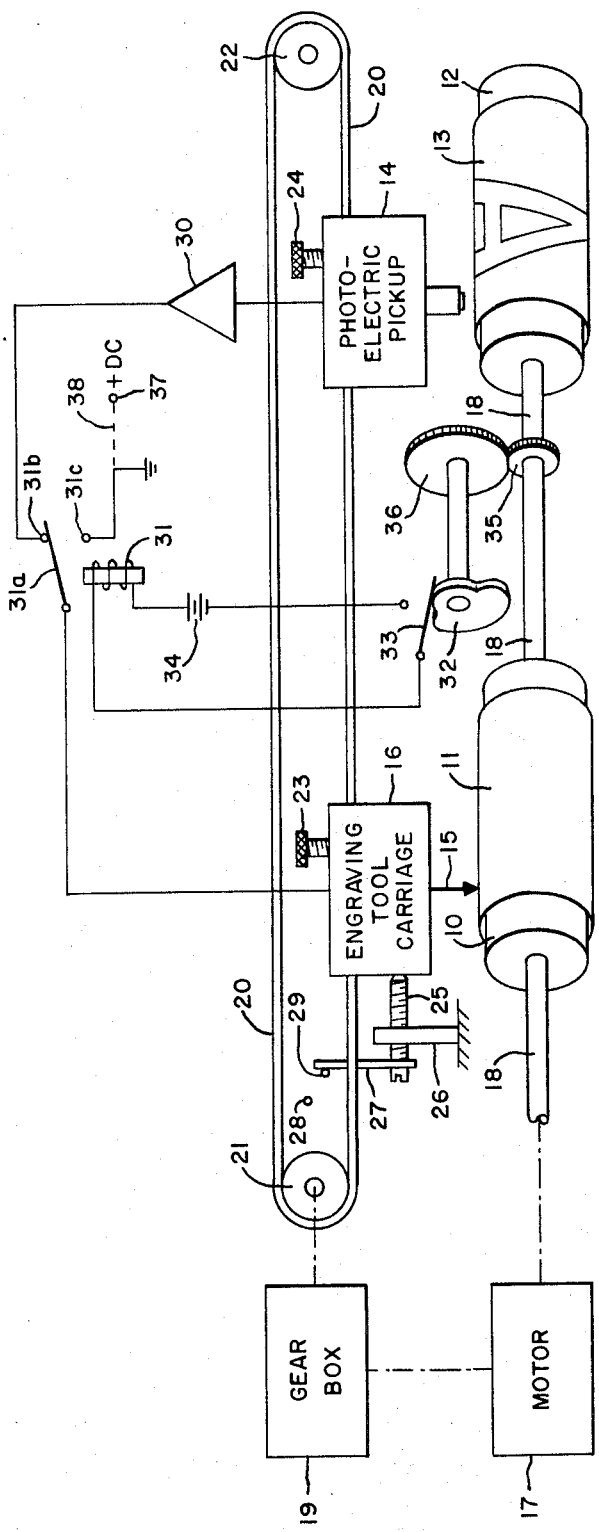

This invention relates to a machine for producing engraving plates and more particularly to such a machine for producing such a plate or plates by means of which there may be produced interlaced images of two different copy subjects by printing processes and without resorting to photographic devices or processes.

There has developed a certain demand for so-called "multivision" pictures primarily for use in advertising and publicity. Such a picture is, in reality, two different pictures interlaced with each other in a certain manner so that, when seen through a lenticular screen in close proximity to the plane of the combined pictures, the effect produced is that, at certain viewing angles, only one of the pictures can be seen while, at other viewing angles, only the other picture can be seen. There is a relatively rapid transition from one picture to the other as the viewing angle is varied. By way of example, it is possible to combine a copy subject having a utilitarian function, such as a credit card, with an advertisement of the concern issuing the card.

While such multivision pictures have been well known in the art for many years, their use has been restricted by the fact that, in general, they have required either a considerable amount of hand art work or complex photographic processes to produce them. One such photographic method of producing such multivision pictures is described in Patent 2,815,310 to Anderson.

It is an object of the invention, therefore, to provide a new and improved machine for producing an engraving plate which is capable of producing multivision pictures while obviating the above-mentioned limitations on prior methods of producing them.

In general, the present invention involves certain modifications of, and improvements upon, the photoelectric engraving machine described and claimed in Patent Re. 23,914 to Boyajean.

In accordance with the invention, there is provided a machine for producing deforable engraving plate means effective to produce interlaced images of two different copy subjects by printing processes comprising a first member for supporting a plate to be engraved, a second member for supporting the subjects, an electrooptical pickup system disposed to view a copy subject on the second supporting member, a plate deforming tool disposed to engage a plate on the first supporting member, means for relatively moving the supporting members and the pickup system and the deforming tool synchronously to scan the copy subject and the engraving plate, respectively, in two directions, means responsive to the output of the pickup system for actuating the deforming tool, and means for interrupting the response of the tool to the pickup system during alternate lines of scanning of one of the copy subjects and during intervening lines of scanning of the other of the copy subjects. The term "deforming tool" is used herein and in the appended claims to encompass various forms of tools for deforming an engraving plate by cutting, drilling, thermal evaporation or decomposition, and the like. For brevity, the term "alternate lines" is used herein and in the appended claims to refer to the first scanning operation of the machine while the term "intervening lines" is used herein and in the appended claims to refer to the second scanning operation in which the copy subject is scanned in a series of lines interlaced with the first scanning operation.

For a better understanding of the present invention, together with other and further objects thereof, reference is had to the following description, taken in connection with the accompanying drawing, while its scope will be pointed out in the appended claims.

Figure 2C:
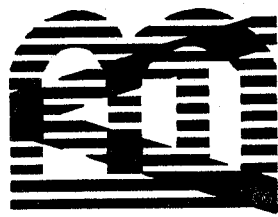
Figure 2B:
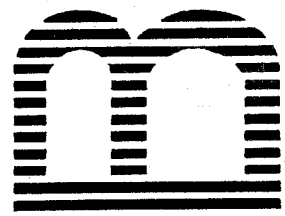
Figure 2A:
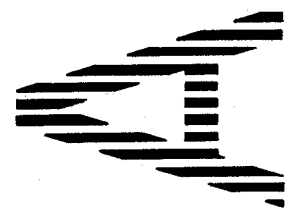

Referring now to the drawing:

FIG. 1 is a schematic representation of a machine for producing an engraving plate embodying the invention in a preferred form, while FIGS. 2a to 2c, inclusive, illustrate pictorially certain steps in the process of producing multivision pictures by the apparatus of FIG. 1.

Referring now more particularly to FIG. 1 of the drawing, there is represented schematically a machine for producing a deformable engraving plate effective to produce interlaced images of two different copy subjects by printing processes. This machine comprises a cylindrical member 10 for supporting a plate 11 to be engraved and a cylindrical member 12 for supporting one of the copy subjects 13 to be reproduced, shown as representing a large A. A photoelectric pickup system unit 14 is disposed to view the copy subject 13 on the member 12. There is also provided a plate deforming tool 15 carried by an engraving tool carriage 16 disposed to engage the plate 11 on the member 10. As described hereinafter, the deforming tool 15 engages the plate 11 during scanning of alternate lines of the copy subject 13 and thereafter, in sequence, again engages the plate 11 during scanning of intervening lines of the other of the copy subjects to be reproduced, the second engagement with the plate 11 being displaced by one scanning line.

The machine of FIG. 1 further comprises means for relatively moving the members 10 and 12 on the one hand and the pickup unit 14 and the engraving tool 15 on the other hand, thereby synchronously to scan the copy subject 13 and the engraving plate 11, respectively, in two directions, specifically peripherally and axially. This moving means comprises a motor 17 driving a shaft 18 common to the members 11 and 12. The motor 17 further drives through a gear box 19 an endless steel tape 20 moving over rollers 21 and 22 disposed at opposite ends of the machine. The driving mechanism including the tape 20 engages the carriage 16 which is secured thereto by a releasable clamp 23. The tape 20 similarly engages the photoelectric pickup unit 14 which is secured thereto by a releasable clamp 24, whereby the engagements of the units 14 and 16 with the driving mechanism are selectively releasable to permit adjustment thereof relative to the driving mechanism to provide the scanning operation described hereinafter.

As an optional feature, there may be provided an adjustable stop for the carriage 16. This is shown in the form of a threaded stop 25 mounted in a frame member 26 and having an actuating lever 27 movable between stops 28 and 29, the pitch of the thread of the stop 25 being such that movement of the lever 27 between the stops 28 and 29 effects an axial movement of the stop by the width of one scanning line.

The machine of FIG. 1 further comprises means responsive to the output of the pickup system 14 for actuating the engraved tool 15, specifically an electrical circuit including an amplifier 30 and an electromagnetic switch 31 having a switch blade 31a normally engaging contact 31b so that the switch 31 is normally closed and completes the circuit to the engraving tool carriage 16. Energization of the switch 31 will obviously open the circuit at contact 31b and complete the circuit at contact 31c, which is connected to ground. Except for the inclusion of switch 31 and the adjustable stop mechanism 25–29, the components of the engraving machine so far described are conventional and may be constructed as described in aforesaid Patent Re. 23,914. However, it is preferable to design the pickup unit 14 to develop a unidirectional signal, rather than an alternating signal as in the patent, so as to form a line-cut pattern on plate 11 rather than a half-tone pattern.

In order to control the switch 31, there is provided a cam 32 driven synchronously with the scanning elements for the engraving plate 11 and the copy subject 13 and a switch 33 actuated thereby and interconnected with the winding of the switch 31 through a suitable source as a battery 34. The cam 32 is driven by the shaft 18 through gearing 35, 36 having a gear ratio such as to drive the cam 32 at one-half of the rotational speed of the shaft 18. Approximately one-half of the periphery of the cam 32 is of a greater radius than the other half and the proportions are such that, during one revolution of the shaft 18, the greater radius portion of the cam 32 actuates the switch 33 to complete the circuit of the winding of the switch 31 while, during the succeeding revolution of the shaft 18, the switch 33 engages the lesser radius portion of the cam 32 to open the circuit to the winding of the switch 31. The cam 32 and the switches 31 and 33 to comprise collectively means for interrupting the response of the tool 15 to the pickup system 14 during alternate lines of scanning of one of the copy subjects, for example the copy subject 13, and during intervening lines of scanning of a second copy subject, as described hereinafter.

In considering the operation of the apparatus of FIG. 1, it may be assumed that initially the stop mechanism 25–29 is omitted. Under such an assumption, a sizable set-up area is left at one side of the plate 11 and a corresponding side of the copy subject 13 is provided. The machine is set up so that the units 14 and 16 are at their iniital positions of travel, for example the extreme left-hand ends of their movements, as shown in FIG. 1. The machine is put into operation and, during each alternate line, the engraving tool 15 responds to the photoelectric pickup 14 to engrave one complete peripheral line on the plate 11. During the scanning of intervening lines of the copy subject 13, the cam 32 is effective to open switch 31 to interrupt the electrical circuit between the pickup unit 14 and the engraving tool carriage 16 so that the plate 11 is not engraved during such intervening scanning line.

After completion of the scanning of the copy subject 13, it is removed from the member 12 and a second copy subject, which for example may be a B, is mounted on the member 12. The driving mechanism for the units 14 and 16 is then adjusted manually so that these elements are over the set-up areas of the copy subject 13 and the plate 11, respectively, the releasing clamp 23 is actuated to release the carriage 16 and it is adjusted manually by a distance equal to the width of a scanning line, namely, to register wih the scanning lines of the plate 11 previously left blank. The clamp 23 is then reengaged and the machine operated in its normal fashion to engrave the plate 11 during the scanning of the intervening lines of the copy subject 13.

In the operation of the machine as just described, the portions of the two copy subjects A and B are shown in FIGS. 2a and 2b, the dark line portions representing the scanning lines during which the engraving tool 15 is responsive ot the photoelectric pickup system. The widths of the lines thus represented and their spacing are greatly exaggerated for the sake of clarity. While not directly evident from FIGS. 2a and 2b, the scanning lines of FIG. 2b are interlaced with, or fall between, those of FIG. 2a. The resultant engraved pattern on the engraving plate 11 is represented in FIG. 2c, from which the general outlines of the letters A and B are generally discernible. Of course, in actuality, where the scanning lines are very much narrower in width, for example from 75 to 150 scanning lines per inch, the general outlines of the two letters are much more distinct. Moreover, when a multivision picture such as that shown in FIG. 2c is viewed through a certain range of viewing angles through a linear lenticular lens sheet of the same screen, only one of the letters will be visible while, when viewed through a different range of angles, only the other letter will be visible.

Alternatively, considering the operation of the stop mechanism 25–29 of FIG. 1, it becomes unnecessary to provide the test area at one end of the copy subject 13 and the plate 11. When this stop mechanism is in use, the stop element 25 is adjusted to one extreme position, as by engagement of the lever 27 with the stop 29, the clamp 23 of the carriage 16 is released and it is moved manually to engage the stop 25 when the pickup unit 14 is at its extreme left-hand position as viewed in FIG. 1. The scanning and engraving of alternate lines is then effected as described above. After replacement of the first copy subject by the second copy subject, the pickup unit 14 and the carriage 16 are again returned to their initial positions but the stop 25 is adjusted by engaging the lever 27 with the stop 28, thereby shifting the carriage 16 by the width of one line with respect to its initial position and the intervening lines are scanned as described above. The result is the same as in the first alternative arrangement described.

In an alternate arrangement of the machine of FIG. 1, the contact 31c of switch 31 is connected to a terminal 37 comprising a suitable DC source, rather than to ground, as indicated by the dotted-line connection 38. In the operation of the machine with this alternate connection, a plate 11 is engraved during the scanning of alternate lines as described above. During intervening lines, the tool carriage 16 is connected via the switch contact 31c to the DC source at terminal 37, the potential being adjusted to correspond to an extreme value of brightness of the scanned copy subject, for example white, thus to completely remove all information material of the engraving plate effective in printing during the intervening lines when the first copy subject, the letter A, is being scanned. Upon completion of this operation, both the initial copy subject 13 and the plate 11 are removed from the machine and at the same time that the second copy subject, for example the letter B, is mounted on the member 12, a second engraving plate 11 is mounted on the member 10. The two units 14 and 16 are again adjusted to their starting point in a conventional manner and the stop 25 is adjusted to advance the carriage 16 by the width of one line and the scanning operation is repeated. During this operation and the scanning of the intervening lines of the second copy subject 13, intervening lines of the second plate 11 are engraved while the alternate lines are completely removed. The two plates 11 are then printed in succession on the same proof sheet or equivalent, in register, so that on the printed sheet there is produced a multivision picture, as represented in FIG. 2c, which is substantially identical to that produced by the single plate engraved in the manner described in either of the first two alternatives.

Thus there is provided an improved photoelectric engraving machine which is capable of producing an engraving plate or plates which, in turn, produce multivision pictures for viewing through a conventional lecticular screen.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A machine for producing deformable engraving plate means effective to produce interlaced images of two different copy subjects by printing processes comprising:
    a first member for supporting a plate to be engraved;
    a second member for supporting said subjects;
    an electrooptical pickup system disposed to view a subject on said second member;
    a plate deforming tool disposed to engage a plate on said first member;
    means for relatively moving said members and said pickup system and said tool synchronously to scan said subject and said engraving plate, respectively, in two directions;
    means responsive to the output of said pickup system for actuating said tool; and
    means for interrupting the response of said tool to said pickup system during alternate lines of scanning of one of said subjects and during intervening lines of scanning of the other of said subjects.

2. An engraving machine in accordance with claim 1 which produces a single engraving plate and in which the engraving tool engages the plate during scanning of alternate lines of one of said subjects and in sequence during scanning of intervening lines of the other of said subjects.

3. An engraving machine in accordance with claim 1 in which said supporting members are cylindrical and in which the two directions of scanning are peripherally and axially of said cylindrical members.

4. An engraving machine in accordance with claim 1 in which said pickup responsive means includes an electrical circuit having a normally closed switch therein and said interrupting means comprises means for opening said switch.

5. An engraving machine in accordance with claim 4 in which said switch opening means comprises a cam driven synchronously with the scanning means.

6. An engraving machine in accordance with claim 1 in which said moving means includes a driving mechanism engaging said pickup system and said tool, the engagement with said pickup system being selectively releasable to permit adjustment thereof to scan alternate or intervening lines of an associated image.

7. An engraving machine in accordance with claim 1 in which said moving means includes a driving mechanism engaging said pickup system and said tool, the engagement with said tool being selectively releasable, and including an adjustable stop for said tool to set the same to engrave alternate or intervening lines of an associated plate.

8. An engraving machine in accordance with claim 1 which produces two engraving plates in sequence and in which the engraving tool engages a first of said plates during scanning of alternate lines of a first of said subjects and in sequence engages the second of said plates during scanning of intervening lines of the second of said subjects.

9. An engraving machine in accordance with claim 8 in which the engraving tool deforms said first plate during scanning of intervening lines of the first of said subjects and said second plate during scanning of alternate lines of the second of said subjects, such deformations corresponding to an extreme value of brightness of the copy subjects.

10. An engraving machine in accordance with claim 9 in which the extreme value of brightness of the copy subjects corresponds to white in the reproduced image.

References Cited

UNITED STATES PATENTS

Re. 23,914   12/1954   Boyajean.
3,420,663    1/1969    Huffaker et al. _____ 96—40

ROBERT L. GRIFFIN, Primary Examiner
DONALD E. STOUT, Assistant Examiner

U.S. Cl. X.R.
96—40